(12) United States Patent (10) Patent No.: US 9,246,729 B2
Zhang (45) Date of Patent: Jan. 26, 2016

(54) MULTI-MODE INDICATION IN SUBFIELD IN A SIGNAL FIELD OF A WIRELESS LOCAL AREA NETWORK DATA UNIT

(71) Applicant: Marvell World Trade Ltd., St. Michael (BB)

(72) Inventor: Hongyuan Zhang, Fremont, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 125 days.

(21) Appl. No.: 13/957,236

(22) Filed: Aug. 1, 2013

(65) Prior Publication Data

US 2014/0036811 A1 Feb. 6, 2014

Related U.S. Application Data

(60) Provisional application No. 61/679,353, filed on Aug. 3, 2012.

(51) Int. Cl.
*H04L 27/26* (2006.01)
*H04L 1/00* (2006.01)
*H04B 7/06* (2006.01)
*H04B 7/08* (2006.01)
*H04L 1/06* (2006.01)
*H04L 5/00* (2006.01)

(52) U.S. Cl.
CPC .......... *H04L 27/2602* (2013.01); *H04L 1/0025* (2013.01); *H04L 5/0092* (2013.01); *H04L 27/2613* (2013.01); *H04B 7/0669* (2013.01); *H04B 7/0689* (2013.01); *H04B 7/0891* (2013.01); *H04L 1/0618* (2013.01); *H04L 5/0023* (2013.01); *H04L 5/0044* (2013.01)

(58) Field of Classification Search
None
See application file for complete search history.

(56) References Cited

U.S. PATENT DOCUMENTS

| 7,599,332 | B2 | 10/2009 | Van Zelst et al. |
| 7,742,390 | B2 | 6/2010 | Mujtaba |
| 8,289,869 | B2 | 10/2012 | Sawai |
| 8,339,978 | B2 | 12/2012 | Sawai et al. |
| 8,462,863 | B1 | 6/2013 | Zhang et al. |

(Continued)

FOREIGN PATENT DOCUMENTS

WO WO-2012/122119 A1 9/2012

OTHER PUBLICATIONS

International Search Report and Written Opinion for International Application No. PCT/US2013/053275 mailed Oct. 31, 2013.

(Continued)

*Primary Examiner* — Vinncelas Louis

(57) ABSTRACT

In a method for generating an orthogonal frequency division multiplexing (OFDM) physical layer (PHY) data unit, a signal field of the data unit is generated. The signal field includes a first subfield to indicate a configuration used for transmission of the data unit and a second subfield to indicate information regarding one of a plurality of modes for the data unit. When the configuration is a first configuration, the second subfield indicates information regarding a first mode of the plurality of modes. When the configuration is a second configuration, the second subfield indicates information regarding a second mode of the plurality of modes. The data unit is generated to include a preamble and a data portion. The signal field is included in the preamble. The data portion is generated according to one of i) the information regarding the first mode or ii) the information regarding the second mode.

8 Claims, 8 Drawing Sheets

(56) References Cited

U.S. PATENT DOCUMENTS

| | | | |
|---|---|---|---|
| 8,526,351 B2 | 9/2013 | Fischer et al. | |
| 8,599,804 B2 | 12/2013 | Erceg et al. | |
| 8,619,907 B2 | 12/2013 | Mujtaba et al. | |
| 8,724,720 B2 | 5/2014 | Srinivasa et al. | |
| 8,867,653 B2 | 10/2014 | Zhang et al. | |
| 8,948,283 B2 | 2/2015 | Zhang | |
| 2009/0147722 A1 | 6/2009 | Ramachandran | |
| 2009/0196163 A1 | 8/2009 | Du | |
| 2010/0046656 A1 | 2/2010 | van Nee et al. | |
| 2010/0260159 A1 | 10/2010 | Zhang et al. | |
| 2010/0309834 A1 | 12/2010 | Fischer et al. | |
| 2011/0002219 A1 | 1/2011 | Kim et al. | |
| 2011/0069778 A1* | 3/2011 | Kim | 375/285 |
| 2011/0096796 A1* | 4/2011 | Zhang et al. | 370/474 |
| 2012/0201316 A1 | 8/2012 | Zhang et al. | |
| 2012/0294294 A1 | 11/2012 | Zhang | |
| 2013/0128806 A1* | 5/2013 | Vermani et al. | 370/328 |
| 2013/0202001 A1 | 8/2013 | Zhang | |
| 2013/0272147 A1 | 10/2013 | Vermani et al. | |

OTHER PUBLICATIONS

Park, "Proposed Specification Framework for TGah,", doc. No. IEEE 802.11-11/1137r10, *The Institute of Electrical and Electronics Engineers* (Jul. 2012).

Ward, "801.11ac Technology Introduction, White Paper," *Rhode & Schwarz*, (Mar. 2012).

Park, "Proposed Specification Framework for TGah", *The Institute of Electrical and Electronics Engineers*, doc. No. IEEE 802.11-11/1137r6, (Mar. 2012).

IEEE Std 802.11 g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, " *The Institute of Electrical and Electronics Engineers, Inc.*, 69 pages, Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11a-1999 (Supplement to IEEE Std 802. 11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, 91 pages (1999).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, 1999.

IEEE Std 802.11 ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, Nov. 2011.

Park, "Proposed Specification Framework for TGah D9.x", *The Institute of Electrical and Electronics Engineers*, doc. No. IEEE 802.11-yy/xxxxr0, (Jul. 2012).

IEEE Std 802.11 g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, May 2002.

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802.11 a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999) Reaffirmed Jun. 12, 2003.

IEEE Std 802.11 b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, 23 pages, Nov. 7, 2001.

IEEE Std P802.11-REVma/06.0, "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications. (This document reflects the combining of the 2003 Edition of 802.11 plus the 802.11 g, 802.11 h, 802.11 i and 802.11j Amendments) (Revision of IEEE Std 802.11-1999) (Superseded by P802.11-REVma_D7.0)," 2006.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Chen, "Home Network Basis: Transmission Environments and Wired/Wireless Protocols," Prentice Hall (Jul. 2003).

Hiertz, et al., "The IEEE 802.11 Universe," IEEE Communications Magazine, pp. 62-70, Jan. 2010.

S. A. Mujtaba, "IEEE P802.11—Wireless LANs, TGn Sync Proposal Technical Specification," *The Institute of Electrical and Electronics Engineers, Inc.*, doc.: IEEE 802.11—04/0889r6, May 2005.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11 n™ IEEE Standard for Information Technology—Telecommunications and information exchange between systems—Local and metropolitan area networks—Specific requirements, Part 11: Wireless LAN Medium Access Control (MAC) and Physical

(56) References Cited

OTHER PUBLICATIONS

Layer (PHY) Specifications: Amendment 5: Enhancements for Higher Throughput," *The Institute of Electrical and Electronics Engineers, Inc.*, Oct. 2009.

van Nee, et al., "The 802.11 n. MIMO-OFDM Standard for Wireless LAN and Beyond," Wireless Personal Communications, vol. 37, pp. 445-453 (Jun. 2006).

Stacey et al., "IEEE P802.11, Wireless LANs, Proposed TGac Draft Amendment," Institute of Electrical and Electronics Engineers, doc. No. IEEE 802.11-10/1361r3 (Jan. 2011).

Stacey et al., "Specification Framework for TGac," document No. IEEE 802.11-09/0992r20, *Institute for Electrical and Electronics Engineers*, pp. 1-49, Jan. 18, 2011.

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.

Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-946 (2010).

Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).

Shi et al., "Phase Tracking During VHT-LTF," Doc. No. IEEE 802.11-10/0771r0, *The Institute of Electrical and Electronics Engineers, Inc.*, Jul. 2010.

van Zelst et al., "Pilot Sequence for VHT-DATA," Doc. No. IEEE 802.11-10/0811r1, *The Institute of Electrical and Electronics Engineers, Inc.*, Jul. 2010.

Yu, et al. "Coverage extension for IEEE802.11ah," *The Institute of Electrical and Electronics Engineers*, doc. No. IEEE 802.11-11/0035r1, (Jan. 2011).

Taghavi et al., "Introductory Submission for TGah", doc. No. IEEE 802.11-11/0062r0, *Institute for Electrical and Electronics Engineers*, pp. 1-5 (Jan. 14, 2011).

de Vegt, "Potential Compromise for 802.11ah Use Case Document", Institute of Electrical and Electronics Engineers, doc. No. IEEE 802.11-11/0457r0, (Mar. 2011).

Zhang et al., "11ah Data Transmission Flow," *The Institute of Electrical and Electronics Engineers*, doc. No. IEEE 802.11-11/1484r1, (Nov. 2011).

Vermani, et al. "Preamble Format for 1 MHz," *The Institute of Electrical and Electronics Engineers*, doc. No. IEEE 802.11-11/1482r2, (Nov. 2011).

Zhang et al., "1MHz Waveform in Wider BW ", *The Institute of Electrical and Electronics Engineers*, doc. No. IEEE 802.11-12/0309r1, (Mar. 2012).

Vermani, et al. "Spec Framework Text for PHY Numerology," *The Institute of Electrical and Electronics Engineers*, doc. No. IEEE 802.11-11/1311r0, (Sep. 2011).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers*, Inc., pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11TM 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

Chun, et al. "Legacy Support on HEW frame structure," doc: IEEE 11-13/1057r0, *The Institute of Electrical and Electronics Engineers, Inc.*, pp. 1-8 (Sep. 2013).

Lee et al., "TGaf PHY proposal," *The Institute of Electrical and Electronics Engineers*, doc. No. IEEE 802.11-12/0809r5, pp. 1-43 (Jul. 10, 2012).

Park et al., "Low Power Capability Support for 802.11ah," doc. No. IEEE 802.11-11/0060r1, *The Institute for Electrical and Electronics Engineers*, 7 pages (Jan. 17, 2011).

Park, "Proposed Specification Framework for TGah", *The Institute of Electrical and Electronics Engineers*, doc. No. IEEE 802.11—yy/xxxxr05, (Jan. 2012).

Park, "Proposed Specification Framework for TGah", *The Institute of Electrical and Electronics Engineers*, doc. No. IEEE 802.11-11/1137r11, pp. 1-36 (Sep. 2012).

Park, "Specification Framework for TGah," *The Institute of Electrical and Electronics Engineers*, doc. No. IEEE 802.11-11/1137r13, pp. 1-58 (Jan. 14, 2013).

Shao, "Channel Selection for 802.11ah," doc.: IEEE 802.11-12/0816r0, pp. 1-11 (Jul. 2012).

Zhang et al., "Beamforming Feedback for Single Stream," *The Institute of Electrical and Electronics Engineers*, doc. No. IEEE 802.11-12/1312r0, pp. 1-22 (Nov. 12, 2012).

International Preliminary Report on Patentability in International Application No. PCT/US2013/053275, dated Feb. 3, 2015 (8 pages).

\* cited by examiner

FIG. 5

|  | Short preamble | Long preamble | |
|---|---|---|---|
|  | SU | SU | MU |
| SU/MU Indication | - | 1 | 1 |
| Length / Duration | 9 | 9 | 9 |
| MCS | 4 | 4 | - |
| BW | 2 | 2 | 2 |
| Aggregation | 1 | 1 | - |
| STBC | 1 | 1 | 1 |
| Coding | 2 | 2 | 5 |
| SGI | 1 | 1 | 1 |
| GID | - | - | 6 |
| $N_{STS}$ | 2 | 2 | 8 |
| PAID | 9 | 9 | - |
| Ack Indication | 2 | 2 | 2 |
| Smoothing | 1 | - | - |
| Beam-change Indication | - | 1 | - |
| Multi-Mode (e.g., Doppler/STBC2) | 1 | 1 | 0 or 1 |
| Reserved | 3 | 2 | 2 |
| CRC | 4 | 4 | 4 |
| Tail | 6 | 6 | 6 |
| Total | 48 | 48 | 48 |

FIG. 6

| SIG Field | Bits |
|---|---|
| STBC | 1 |
| $N_{STS}$ | 2 |
| SGI | 1 |
| Coding | 2 |
| MCS | 4 |
| Aggregation bit | 1 |
| Length | 9 |
| Ack Indication | 2 |
| Multi-mode (e.g., Doppler/STBC2) | 1 |
| Reserved/others | 3 |
| CRC | 4 |
| Tail | 6 |
| Total | 36 |

MULTI-MODE INDICATION IN SUBFIELD IN A SIGNAL FIELD OF A WIRELESS LOCAL AREA NETWORK DATA UNIT

CROSS-REFERENCES TO RELATED APPLICATIONS

This claims the benefit of U.S. Provisional Patent Application No. 61/679,353, entitled "11ah SIG Field Overloading Bits" and filed on Aug. 3, 2012, the disclosure of which is incorporated herein by reference.

FIELD OF THE DISCLOSURE

The present disclosure relates generally to communication networks and, more particularly, to multi-mode signal field indications in communication networks.

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun on two new standards, IEEE 802.11ah and IEEE 802.11af, each of which will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub-1 GHz range that remain unlicensed, with different specific unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In an embodiment, a method for generating an orthogonal frequency division multiplexing (OFDM) physical layer (PHY) data unit for transmission via a communication channel includes generating a signal field of the data unit to include a first subfield to indicate a configuration used for transmission of the data unit and a second subfield to indicate information regarding one of a plurality of modes for the data unit. The method also includes, when the configuration is a first configuration, generating the second subfield to indicate information regarding a first mode of the plurality of modes. The method further includes, when the configuration is a second configuration, generating the second subfield to indicate information regarding a second mode of the plurality of modes. The method additionally includes generating the data unit to include a preamble and a data portion, wherein the signal field is included in the preamble, and wherein the data portion is generated according to one of i) the information regarding the first mode or ii) the information regarding the second mode.

In another embodiment, an apparatus comprises a network interface configured to generate a signal field of the data unit to include a first subfield to indicate a configuration used for transmission of the data unit, and a second subfield to indicate information regarding one of a plurality of modes for the data unit. The network interface is also configured to, when the configuration is a first configuration, generate the second subfield to indicate information regarding a first mode of the plurality of modes, and when the configuration is a second configuration, generate the second subfield to indicate information regarding a second mode of the plurality of modes. The network interface is further configured to generate the data unit to include a preamble and a data portion. The network interface is further configured to include the signal field in the preamble, and generate the data portion according to one of i) the information regarding the first mode or ii) the information regarding the second mode.

In yet another embodiment, a method for receiving an orthogonal frequency division multiplexing (OFDM) physical layer (PHY) data unit via a communication channel includes receiving a signal field of the data unit. The method also includes decoding a first subfield of the signal field, wherein the first subfield indicates a configuration used for transmission of the data unit, and decoding a second subfield of the signal field, wherein the second subfield indicates one a plurality of modes associated with the data unit. The method further includes determining, based on a value of the first subfield, whether the configuration is a first configuration or a second configuration. The method further still includes, in response to determining that the configuration is a first configuration, determining that the second subfield indicates information regarding a first mode of the plurality of modes and in response to determining that the configuration is a second configuration, determining that the second subfield indicates information regarding a second mode of the plurality of modes. The method additionally includes decoding a data portion of the data unit according to one of i) the information regarding the first mode or ii) the information regarding the second mode.

In still another embodiment, an apparatus comprises a network interface configured to receive a signal field of the data unit. The network interface is also configured to decode a first subfield of the signal field, wherein the first subfield indicates a configuration used for transmission of the data unit, and decode a second subfield of the signal field, wherein the second subfield indicates one a plurality of modes associated with the data unit. The network interface is further configured to determine, based on a value of the first subfield, whether the configuration is a first configuration or a second configuration. The network interface is further still configured to in response to determining that the configuration is a first configuration, determine that the second subfield indicates information regarding a first mode of the plurality of modes, and in response to determining that the configuration is a second configuration, determine that the second subfield indicates information regarding a second mode of the plurality of modes. The network interface is additionally configured to decode a data portion of the data unit according to one of i) the information regarding the first mode or ii) the information regarding the second mode.

BRIEF DESCRIPTION OF THE DRAWINGS

FIG. 5 is a table listing various subfields of a signal field included in a short preamble of a single user data unit, a long preamble of a single user data unit, and a long preamble of a multi-user data unit, according to various embodiments.

FIG. 6 is a table listing various subfields of a signal field of a low bandwidth preamble, according to an embodiment.

DETAILED DESCRIPTION

Figure 1:
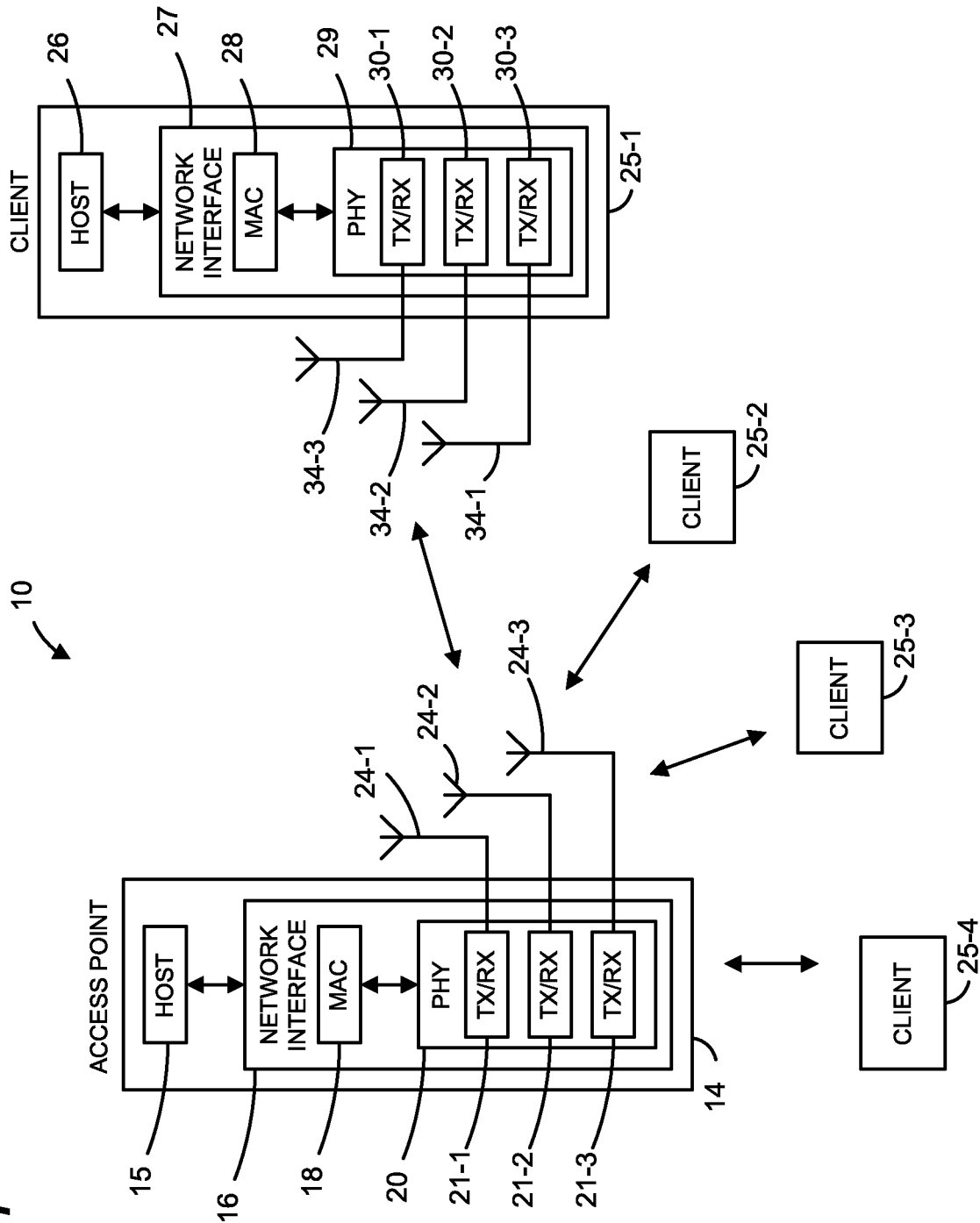
FIG. 1 is a block diagram of an example WLAN in which one or more communication devices are configured to utilize multi-mode indication techniques described herein, according to an embodiment.

In embodiments described below, wireless network devices such as an access point (AP) and client devices of a wireless local area network (WLAN) transmit data streams between the AP and the client devices. The AP is configured to operate with client stations according to at least one communication protocol. The communication protocol defines operation in a sub-1 GHz frequency range, and is typically used for applications requiring long range wireless communication with relatively low data rates. The communication protocol (e.g., IEEE 802.11ah or IEEE 802.11af) is referred to herein as a "long range" communication protocol. In some embodiments, physical layer (PHY) data units conforming to the long range communication protocol ("long range data units") are the same as or similar to "short range" data units conforming to a higher frequency, shorter range communication protocol (e.g., IEEE 802.11n, and/or IEEE 802.11ac), but are generated using a lower clock rate (e.g., by downclocking an IEEE 802.11n or 802.11ac signal). In one embodiment, for example, the long range communication protocol defines 2 MHz, 4 MHz, 8 MHz and 16 MHz data units that are substantially similar to IEEE 802.11n or 802.11ac 20 MHz, 40 MHz, 80 MHz and 160 MHz data units, respectively, and are generated using the same inverse fast Fourier transform (IFFT) size as the respective IEEE 802.11n or 802.11ac data unit, but are generated using a ten times slower clock rate than the respective IEEE 802.11n or 802.11ac data unit. Like IEEE 802.11n and IEEE 802.11ac short range data units, long range data units are transmitted on multiple subcarriers/tones, using orthogonal frequency division multiplexing (OFDM), over a wireless channel.

In some embodiments, in addition to defining "normal bandwidth" data units, such as the 2 MHz, 4 MHz, 8 MHz and 16 MHz described above, long range communication protocol defines "low bandwidth mode" data units that are transmitted over a bandwidth smaller than any normal mode bandwidth channel (e.g., over a 1 MHz bandwidth) and have a lower data rate. In one embodiment where a normal mode 2 MHz or greater data unit is generated using a 64-point or greater IFFT, for example, a low bandwidth mode 1 MHz data unit is generated using a 32-point IFFT. The lower data rate of the low bandwidth mode data unit allows the low bandwidth mode to further extend communication range, which generally improves receiver sensitivity, in an embodiment. In various embodiments, the low bandwidth mode is used only as a control mode (e.g., for signal beacon or association procedures, transmit beamforming training operations, etc.), only for extended range data communications, or both.

In an embodiment, a data unit (e.g., a normal mode data unit or a low bandwidth mode data) transmitted by the AP includes a preamble containing one or more signal fields that carry information required at the receiver to properly identify and decode the data unit. For example, the signal field includes a mode indication bit (or bits) used to indicate whether a particular mode is being utilized for transmission of the data unit. In some embodiments, certain such modes are utilized only in some situations (e.g., only in cases of single stream transmissions) and other such modes are utilized in other situations that do not overlap with the first situations (e.g., only in cases of multi stream transmissions). In some such embodiments, a single multi-mode subfield of the signal field is used for indicating both of such modes, and the multi-mode subfield is interpreted based on a value of another subfield of the signal field (e.g., a subfield that indicates whether the data unit is a single stream data unit or a multi-stream data unit). Sharing of a subfield of the signal field by two different mode indications results in efficient utilization of limited number of bits available in the signal field, in at least some embodiments.

FIG. 1 is a block diagram of an example WLAN 10 in which one or more communication devices are configured to utilize multi-mode indication techniques described herein, according to an embodiment. The WLAN 10 includes an AP 14 having a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 further includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In some embodiments, one, some, or all of the client stations 25-2, 25-3, and 25-4 has/have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In an embodiment, the PHY processing unit 20 of the AP 14 is configured to generate data units conforming to the long range communication protocol, and the transceiver(s) 21 is/are configured to transmit the generated data units via the antenna(s) 24. Similarly, the PHY processing unit 20 of the AP 14 is configured to process received data units conforming to the long range communication protocol, in an embodiment, with the data units being received by the transceiver(s) 24 via the antenna(s) 24. Data units conforming to the long range protocol will be described with reference to FIGS. 4-8 below, according to various different embodiments.

Figure 2A:
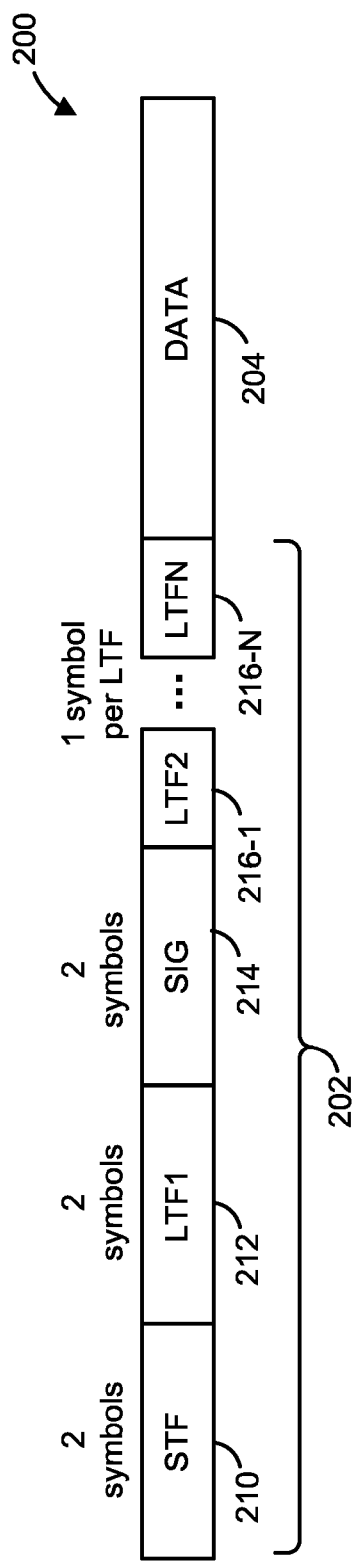
FIG. 2A is a diagram of an example long range data unit having a short preamble format, according to one such embodiment.
Figure 2B:
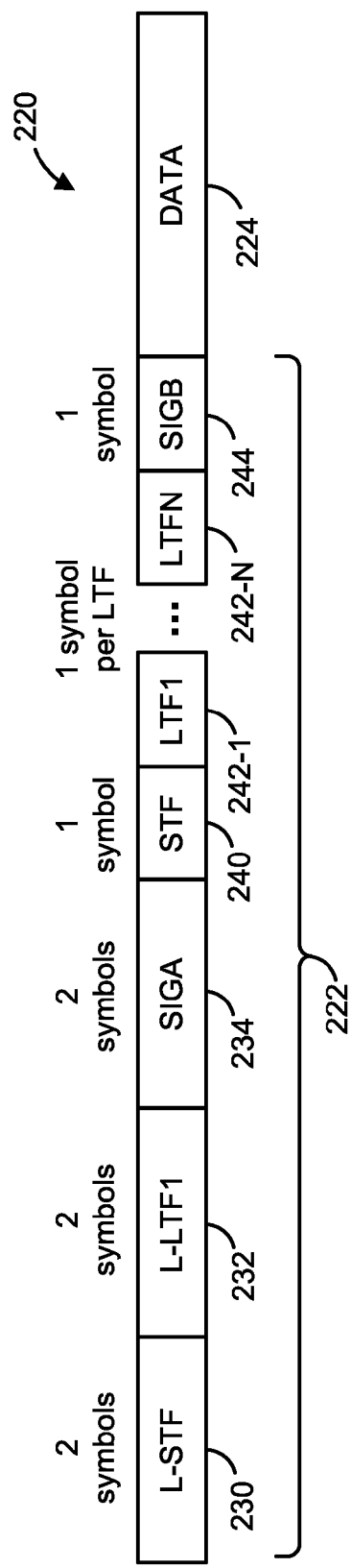
FIG. 2B is a diagram of an example long range data unit having a long preamble format, according to an embodiment.

In some embodiments, each long range data unit can have one of multiple different preamble formats, such as the preamble formats shown in FIGS. 2A and 2B. FIG. 2A is a diagram of an example long range data unit 200 having a "short preamble" format, according to one such embodiment. The long range data unit 200 includes a short preamble 202 and a data portion 204. In the example embodiment of FIGS. 2A and 2B, the short preamble 202 includes an STF 210 with two OFDM symbols, a first LTF (LTF1) 212 with two OFDM symbols, a SIG field 214 with two OFDM symbols, and a total of N−1 additional LTFs (216-1 through 216-N) each having one OFDM symbol. In an embodiment, the STF 210 is used for packet detection and automatic gain control, the LTFs 212 and 216-1 through 216-N are used for channel estimation, and the SIG field 214 indicates certain PHY and/or MAC characteristics of the data unit (e.g., length or duration, MCS, etc.). In an embodiment, the short preamble 202 includes one LTF for each multiple input multiple output (MIMO) spatial stream (e.g., for two spatial streams, such that the short preamble 202 includes LTF1 212 and LTF2 216-1, but no additional LTFs). In an embodiment, the long range data unit 200 has the same format as an IEEE 802.11n data unit with a "Greenfield" preamble format.

FIG. 2B is a diagram of an example long range data unit 220 having a "long preamble" format, according to an embodiment. The long range data unit 220 includes a long preamble 222 and a data portion 224. In the example embodiment of FIGS. 2A and 2B, the long preamble 222 includes a first, legacy STF (L-STF) 230 with two OFDM symbols, a first, legacy LTF (L-LTF1) 232 with two OFDM symbols, a first, legacy SIG (SIGA) field 234 with two OFDM symbols, a second, non-legacy STF 240 with one OFDM symbol, N−1 additional, non-legacy LTFs (242-1 through 242-N) each having one OFDM symbol, and a second, non-legacy SIG (SIGB) field 244 with one OFDM symbol. In an embodiment, the long preamble format of long range data unit 220 is used when in a multi-user mode, and the LTFs 242 of the long preamble 222 include one LTF per user. In some embodiments, a receiver can auto-detect whether a long range data unit has the short or long preamble format by determining the modulation type of one or more OFDM symbols within the first SIG field (i.e., SIG field 214 in long range data unit 200, or SIGA field 234 in long range data unit 220). In an embodiment, the long range data unit 220 has the same format as an IEEE 802.11n data unit with a "mixed mode" preamble format, or the same format as an IEEE 802.11ac data unit.

Figure 3:
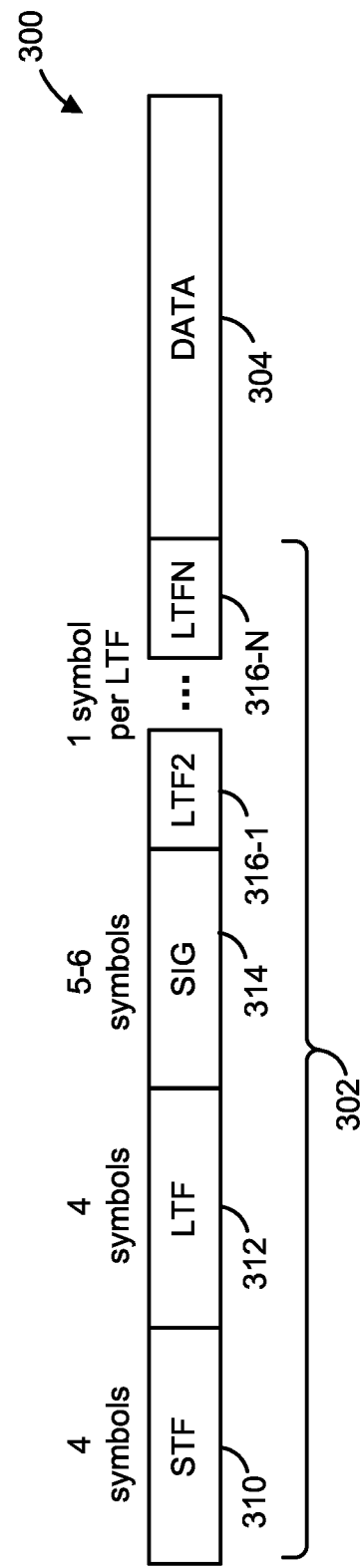
FIG. 3 is a diagram of an example long range data unit having a low bandwidth preamble format, according to an embodiment.

FIG. 3 is a diagram of an example long range data unit 300 having a "low bandwidth preamble" format, according to an embodiment. The long range data unit 300 includes a low bandwidth preamble 302 and a data portion 304. The low bandwidth preamble 302 is similar to the short preamble 202 of FIG. 2, but various fields of the low bandwidth preamble 302 are longer and include greater numbers of OFDM symbols compared to the corresponding fields of the short preamble 202, in an embodiment. In the example embodiment of FIG. 3, the low bandwidth preamble 302 includes an STF 310 with four OFDM symbols, a first LTF (LTF1) 312 with four OFDM symbols, a SIG field 314 with, depending on the particular embodiment, five or six OFDM symbols, and a total of N−1 additional LTFs (316-1 through 316-N) each having one OFDM symbol. In an embodiment, the STF 310 is used for packet detection and automatic gain control, the LTFs 312 and 316-1 through 316-N are used for channel estimation, and the SIG field 314 indicates certain PHY and/or MAC characteristics of the data unit (e.g., length or duration, MCS, etc.). In an embodiment, the low bandwidth preamble 202 includes one LTF for each multiple input multiple output (MIMO) spatial stream (e.g., for two spatial streams, such that the low bandwidth preamble 302 includes LTF1 312 and LTF2 316-1, but no additional LTFs). In an embodiment, the low bandwidth data unit 300 has the same format as an IEEE 802.11n data unit with a "Greenfield" preamble format, with at least some of the fields being longer, in terms of OFDM symbols, compared to the corresponding fields of the IEEE 802.11n Greenfield preamble format.

In various embodiments, a SIG field of a preamble of a data unit (e.g., the SIG field 214, the SIGA field 324, the SIGB field 244, the SIG field 314) contains PHY and/or MAC information needed by a receiving device to properly decode the data unit. For example, a SIG field of a preamble of a data unit includes one or more bits to indicate to the receiving device whether a certain PHY mode (e.g., a short guard interval (SGI) mode, beamforming mode, an STBC mode, Doppler mode, etc.) is being utilized for the data unit. In some embodiments, certain characteristics indicated in the SIG field are limited to certain configurations. For example, some of such characteristics (e.g., modes) are specified for only certain configurations (e.g., when the number of spatial or space-time streams is equal to one) and are invalid in other configurations (e.g., when the number of spatial or space-time streams is greater than one), in an embodiment. Further, some of such modes do not overlap between the configurations, in some embodiments. For example a first mode is utilized in only in a first configuration (e.g., when the number of spatial or space-time streams is equal to one), while a second mode is utilized in only a second configuration (e.g., when the number of spatial or space-time streams is greater than one). In such embodiments, a multi-mode subfield in a SIG field of a data unit is utilized to indicate each of these modes, and the specific mode being indicated by the multi-mode subfield is determined based on the particular configuration being utilized.

Figure 4:
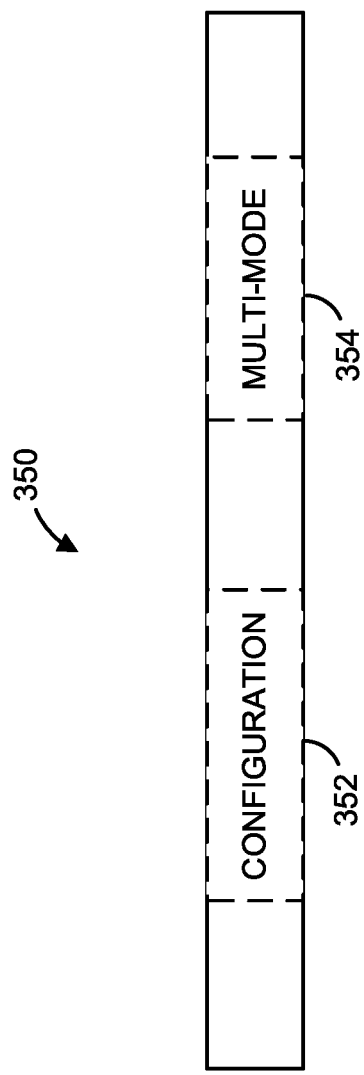
FIG. 4 is a diagram of a signal field that includes a multi-mode subfield, according to an embodiment.

FIG. 4 is a diagram of a signal field 350 that includes a multi-mode subfield, according to an embodiment. In an embodiment, the signal field 350 corresponds to the SIG field 214 of the data unit 200 of FIG. 2A. In another embodiment, the signal field 350 corresponds to the SIG field 234 of the data unit 220 of FIG. 2B. In yet another embodiment, the signal field 530 corresponds to the signal field 314 of the data unit 300 of FIG. 3. In other embodiments, the signal field 350 is included in other suitable data units. Similarly, the data units 200, 220, 300 include suitable signal fiends other than the signal field 350, in other embodiment.

In the embodiment of FIG. 3, the signal field 350 includes a configuration subfield 352 and a multi-mode subfield 354. Although the signal field 350 is illustrated as having only one multi-mode subfield 354, the signal field 350 includes multiple (e.g., 2, 3, 4, etc.) multi-mode subfields 354 in other embodiments. According to an embodiment, the multi-mode subfield 354 is an "overloaded" subfield that is used to indicate different non-overlapping modes being utilized for the current data unit depending the particular configuration indicated, for example, by the configuration subfield 352. For example, for a first configuration (e.g., single spatial or space-time stream configuration), the multi-mode subfield 354 is used to indicate information regarding a first mode, such as whether or not the first mode is being utilized for the current data unit (i.e., the data unit that includes the signal field). Further, for a second configuration (e.g., multiple spatial or space-time stream configuration), the multi-mode subfield 354 is used to indicate information regarding a second mode, such as whether or not the second mode is being utilized for the current data unit. Accordingly, in an embodiment in which the distinguishing characteristic for interpreting the multi-mode subfield 354 is the number of spatial or space-time streams, the configuration subfield 352 indicates the number of spatial or space-time streams used for transmission of the current data unit, and the multi-mode subfield 354 is interpreted based on the number of spatial or space-time streams indicated by the subfield 352. In other embodiments, the configuration subfield 352 indicates other suitable configurations that determine interpretation of the multi-mode subfield 354.

As just an example, in an embodiment, the long range communication specifies a Doppler mode, the use of which is limited to single stream configurations, and a second space time block coding (STBC2) mode, the use of which is limited to multi stream configurations. In this embodiment, the multi-mode subfield 354 is used as a Doppler mode indication when the configuration field 352 indicates that a single spatial space-time stream is used for transmission of the data unit ($N_{STS}=1$), and is used as a second STBC (STBC2) mode indication when the configuration field 352 indicates a multi-stream transmission ($N_{STS}>1$). In various embodiments, the Doppler mode is used to combat high Doppler effect communication channels, such as fast changing outdoor communication channels, for example by introducing traveling pilots into OFDM tones of the data unit (e.g., changing pilot tone positions on a per symbol basis), or by introducing one or several "midambles" transmitted in a data portion of the data unit to allow a receiving device to obtain new channel estimations during reception of the data portion of the data unit or to adjust the channel estimations obtained at the beginning of the data unit. The STBC2 mode indicates a space time block code that is optionally utilized for coding a data portion of the data unit, according to an embodiment. In an embodiment, the Doppler mode is utilized only for single stream transmissions, and is invalid for multi-stream transmissions. On the other hand, the STBC2 mode is utilized only for multi-stream transmissions, and is invalid for single stream transmissions, in this embodiment.

In this embodiment, when the value of the configuration subfield 352 indicates that the number of spatial or space-time streams is equal to one, then the value of the multi-mode subfield 354 indicates information regarding the Doppler mode, and when the value of the configuration subfield 352 indicates that the number of spatial or space-time streams is greater than one, then the value of the multi-mode subfield 354 indicates information regarding the STBC2 mode. For example, in this embodiment, when the value of the configuration subfield 352 indicates that the number of spatial or space-time streams is equal to one, a value of zero (0) of the multi-mode subfield 354 indicates that the Doppler mode is being utilized, and a value of one (1) of the multi-mode subfield 418 indicates that the Doppler mode is not being utilized, or vice versa. In this case, a data portion of the data unit is generating according to whether or not the Doppler mode is used for the data unit, as indicated by the subfield 354, in an embodiment. On the other hand, when the value of the configuration subfield 352 indicates that the number of spatial streams is greater than one, then a value of zero (0) of the multi-mode subfield 354 indicates that STBC2 mode is being utilized, and a value of one (1) of the multi-mode subfield 354 indicates that the STBC2 mode is not being utilized, or vice versa, in this embodiment. In this case, a data portion of the data unit is generating according to whether or not the STBC2 mode is used for the data unit, as indicated by the subfield 354, in an embodiment. Although interpretation of the multi-mode subfield 354 is determined according to the number spatial or space-time streams in this embodiment, the interpretation of the multi-mode subfield 354 is determined according to other subfields of the signal field 350 (e.g., the configuration subfield 352 indicating a parameter other than the number of spatial or space-time streams), or by means other than a subfield of the signal field 350, in other embodiments.

In an embodiment, a receiving device (e.g., a client station 25 or the AP 14 of FIG. 1) receiving a data unit that includes the signal field 350 interprets the subfield 354 based on the value of the subfield 352. For example, in an embodiment, the receiving device decodes the subfield 352 to determine a value of the subfield 352 and, accordingly, the particular configuration (e.g., number of spatial or space-time streams) indicated by the subfield 352. The receiving device also decodes the multi-mode subfield 354, and determines the particular mode being indicated by the multi-mode subfield 354 based on the value of the subfield 352. For example, in an embodiment in which the subfield 354 indicates a number of spatial or space-time streams used for transmission of the current data unit, when the subfield 354 indicates a single stream transmission, the receiving device interprets the subfield 354 as indicating information regarding a Doppler mode, such as whether or not the Doppler mode was used to generate the data unit. In this case, the receiving device decodes a data portion of the data unit based on whether or not the Doppler mode was used to generate the data unit, as indicated by the subfield 354, in an embodiment. On the other hand, when the subfield 354 indicates a multi stream transmission, the receiving device interprets the subfield 354 as indicating information regarding STBC2 mode, such as whether or not STBC2 mode was using to generate the data unit, in an embodiment. In this case, the receiving device decodes the data portion of the data unit based on whether or not the STBC2 mode was used to generate the data unit, as indicated by the subfield 354, in this embodiment. As discussed above, although interpretation of the multi-mode subfield 354 is determined according to the number spatial or space-time streams in this embodiment, the interpretation of the multi-mode subfield 354 is determined according to other subfields of the signal field 350 (e.g., the configuration subfield 352 indicating a parameter other than the number of spatial or space-time streams), or by means other than a subfield of the signal field 350, in other embodiments.

With continued reference to FIG. 3, in some embodiments, the signal field 350 can be included in a single user data unit (e.g., a data unit with one or more spatial streams transmitted to a single receiving device) or in a multi-user data unit (e.g., a data unit with independent spatial streams transmitted to a multiple receiving devices), depending on a particular scenario or situation. In some such embodiments, the non-overlapping modes, such as the Doppler mode and the STBC2 mode discussed above, are defined only for single user data units, and are invalid for multi-user data units. For example, the long range communication protocol specifies that multi-mode subfields are utilized in signal fields of single user data units and are not utilized in signal fields of multi user data units, in some embodiments. In some such embodiments, the signal field 350 excludes the multi-mode subfield 354 when the signal 350 is included in a multi-mode data unit. In other embodiments, one or all of the non-overlapping modes is/are defined for both single user data units and multi-user data units. In such embodiments, the signal field 350 includes the multi-mode subfield 354 regardless of the type of data unit, i.e., regardless of whether the signal field 350 is included in a single user data unit or in a multi-user data unit.

FIG. 5 is a table 400 listing various subfields of a signal field 402 included in a short preamble (e.g., the SIG field 214 of the data unit 200) of a single user data unit (e.g., a data unit that includes one or more data streams for a single client station), a long preamble (e.g., the SIG field 234 of the data unit 220) of a single user data unit, and a long preamble (e.g., the SIG field 234 of the data unit 220) of a multi-user data unit (e.g., a data unit that includes independent data streams for corresponding different receive devices), according to various embodiments. In an embodiment, the signal field 402 corresponds to the signal field 350 of FIG. 3. In other embodiments, the signal field 350 of FIG. 3 omits one or more of the subfields listed in the table 400 and/or includes one or more additional subfields not listed in the table 400. In the example embodiment of FIG. 5, in each of the cases illustrated in the table 400, the signal field 402 includes at least some of the following subfields: a single-user/multi-user (SU/MU) indication subfield 404 (e.g., 1 bit for long preamble), a Length/Duration subfield 406 (e.g., 9 bits), a modulation and coding (MCS) subfield 408 (e.g., 4 bits), a bandwidth (BW) subfield 410 (e.g., 2 bits), an aggregation subfield 412 (e.g., 1 bit for single user), a space time block coding (STBC) subfield 414 (e.g., 1-bit), a coding subfield 416 (e.g., 2 bits for single user, 5 bits for multi-user), a short guard interval (SGI) subfield 418 (e.g., 1 bit), a group identification (GID) subfield 420 (e.g., 6 bits for multi-user), a number of spatial or space-time streams ($N_{STS}$) subfield 422 (e.g., 2 bits for single user, 8 bits for multi-user (e.g., 2 bits for each of up to four client stations)), a partial association identification (PAID) subfield 424 (e.g., 9 bits for single user), an acknowledgement (Ack) indication subfield 426 (e.g., 2 bits), a smoothing subfield 428 (e.g., 1 bit for short preamble), a beam-change indication subfield 430 (e.g., 1 bit for long preamble, single user), a multi-mode subfield 432 (e.g., 1 bit for single user, 1 bit or not used for multi-user), reserved bits 434 (e.g., 3 bits for short preamble, 2 bits for long preamble), CRC bits 436 (e.g., 4 bits), and tail bits 438 (e.g., 6 bits).

Referring to FIG. 4, in an embodiment, the multi-mode subfield 432 corresponds to the multi-mode subfield 354, and the $N_{STS}$ subfield 422 corresponds to the configuration subfield 352. In this embodiment, the multi-mode subfield 432 is interpreted based on the value of the $N_{STS}$ subfield 422. In other embodiments, the multi-mode subfield 432 is interpreted based on a value of another subfield of the signal field 402, or on information other than information included in the signal field 402. Further, in the embodiment of FIG. 5, the multi-mode subfield 432 is a one-bit subfield in single user data units, with the value of the subfield 520 indicating whether a particular mode is being utilized for the current data unit. Similarly, in the embodiment of FIG. 4, in multi-user data units, the multi-mode subfield 432 is either a one bit subfield or a zero bit subfield, for cases when the non-overlapping modes apply to multi-mode data units or are invalid for multi-user data units, respectively. Although at most one bit is allocated for the multi-mode subfield 432 according to the table 400, other numbers of bits (e.g., 2, 3, 4, etc.) are allocated for the multi-mode subfield 432 in other embodiments. In such embodiments, the multi-mode 432 is capable of indicating other information related to one or more of the non-overlapping modes indicated by the multi-mode subfield 432, for example.

FIG. 6 is a table 500 listing various subfields of a signal field 502 of a low bandwidth preamble (e.g., the SIG field 314 of the data unit 300), according to an embodiment. In an embodiment, the signal field 502 corresponds to the signal field 350 of FIG. 3. In other embodiments, the signal field 350 of FIG. 3 omits one or more of the subfields listed in the table 500 and/or includes one or more additional subfields not listed in the table 500. In the example embodiment of FIG. 6, the SIG field 502 includes the following subfields: a space time block coding (STBC) indication subfield 504 (e.g., 1 bit), a number of spatial or space time streams ($N_{STS}$) indication subfield 506 (e.g., 2 bits), a short guard interval (SGI) subfield 508 (e.g., 1 bit), a coding type indication field 510 (e.g., 2 bits), a modulation and coding (MCS) subfield 512 (e.g., 4 bits), an aggregation subfield 514 (e.g., 1 bit), a length indication subfield 516 (e.g., 9 bits), a acknowledgement (Ack) indication subfield 518 (e.g., 2 bits), a multi-mode subfield 520 (e.g., 1 bit), reserved bits 522 (e.g., 3 bits), cyclic redundancy check (CRC) bits 524 (e.g., 5 bits, and tail bits subfield 526 (e.g., 6 bits).

Referring to FIG. 4, in an embodiment, the multi-mode subfield 520 corresponds to the multi-mode subfield 354, and the $N_{STS}$ subfield 506 corresponds to the configuration subfield 352. In this embodiment, the multi-mode subfield 520 is interpreted based on the value of the $N_{STS}$ subfield 506. In other embodiments, the multi-mode subfield 520 is interpreted based on a value of another subfield of the signal field 502, or based on information other than information included in the signal field 502. Further, in the embodiment of FIG. 6, the multi-mode subfield 520 is a one-bit subfield, with the value of the subfield 520 indicating whether a particular mode is being utilized for the current data unit. Although only one bit is allocated for the multi-mode subfield 520 according to the table 500, other numbers of bits (e.g., 2, 3, 4, etc.) are allocated for the multi-mode subfield 520 in other embodiments. In such embodiments, the multi-mode 520 is capable of indicating other information related to one or more of the non-overlapping modes indicated by the multi-mode subfield 520, for example.

Figure 7:
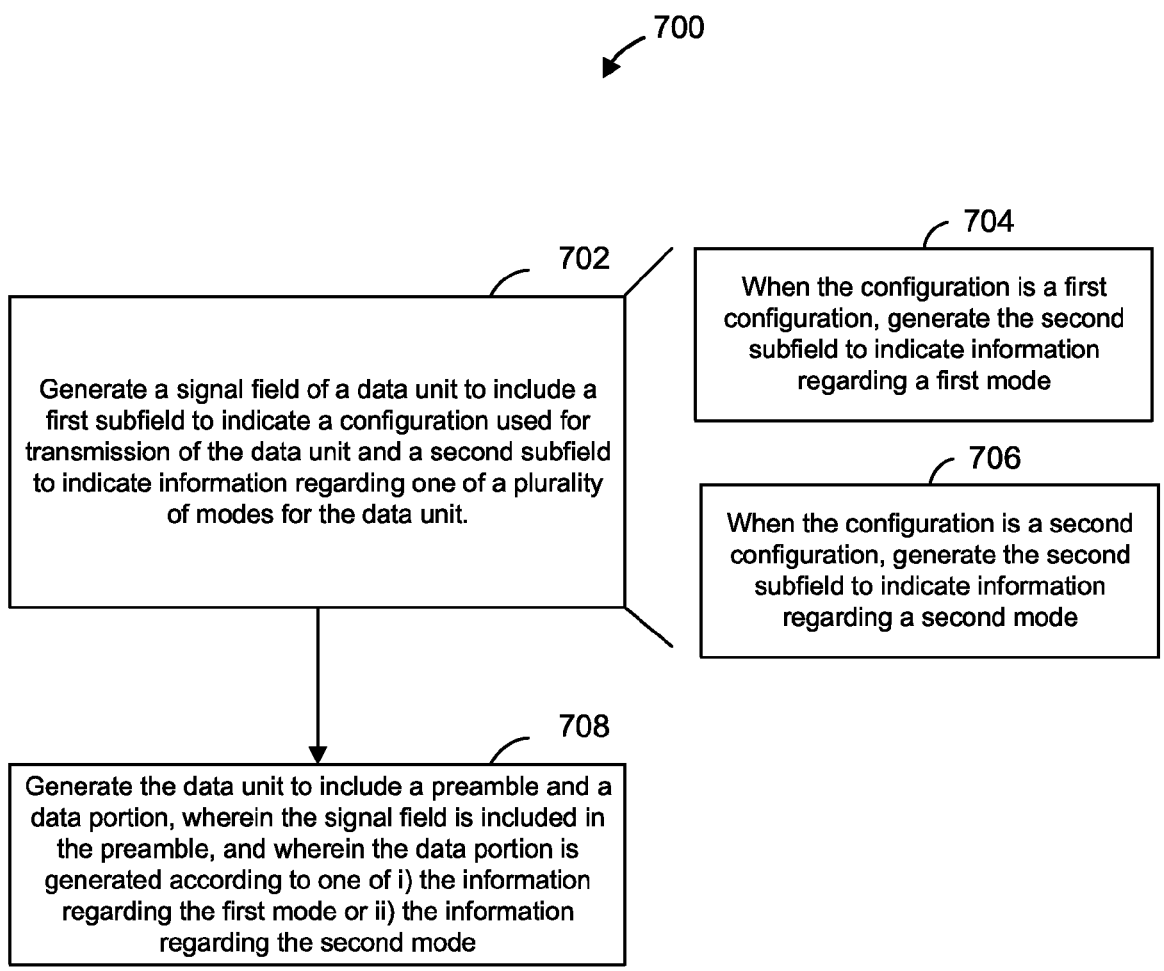
FIG. 7 is a flow diagram of an example method for generating data units, according to an embodiment.

FIG. 7 is a flow diagram of an example method 700 for generating data units, according to an embodiment. The method 700 is implemented by the network interface 16 (e.g., the PHY processing unit 20) (FIG. 1), in an embodiment. The method 700 is implemented by the network interface 27 (e.g., the PHY processing unit 29) (FIG. 1), in another embodiment. In other embodiments, the method 700 is implemented by other suitable network interfaces.

At block 702, a signal field of the data unit is generated. For example, the signal field 350 of FIG. 4 is generated, in an embodiment. In another embodiment, another suitable signal field is generated. In an embodiment, the signal field includes some or all of the subfields 402 listed in the table 400 of FIG. 5. In another embodiment, the signal field includes some or all of the subfields 502 listed in the table 500 of FIG. 6. In other embodiments, the signal field includes other suitable subfields in addition to or instead of the subfields listed in the table 400 or in the table 500.

The signal field generated at block 702 includes a first subfield to indicate a configuration used for transmission of the data unit and a second subfield to indicate information regarding one of a plurality of modes of the data unit. In various embodiments, the second subfield includes one bit or a plurality of bits (e.g., 2, 3, 4, 5, etc. bits). In the example embodiment in which the signal field 350 of FIG. 3 is generated, the first subfield corresponds to the subfield 352 and the second subfield corresponds to the subfield 354. In an embodiment, various modes in the plurality of modes are non-overlapping modes in that a first mode is utilized only for some values of the first subfield and a second mode is utilized only for other values of the first subfield. As just some examples, in various embodiments, the plurality of modes includes a Doppler mode, a STBC2 mode, and/or other non-overlapping modes.

Generating the signal field at block 702 includes operations of block 704 or operation of block 706, in an embodiment. Block 704 generally corresponds to generation of the second subfield when the configuration indicated by the first subfield is a first configuration, and block 704 generally corresponds to generation of the second subfield when the configuration indicated by the first subfield is a second configuration. More specifically, when the configuration is a first configuration, the second subfield is generated at block 704 to indicate information regarding a first mode of the plurality of modes. On the other hand, when the configuration is a second configuration, the second subfield is generated at block 706 to indicate information regarding a second mode of the plurality of modes.

At block 708, the data unit is generated to include a preamble and a data portion. For example, in an embodiment, the data unit 200 of FIG. 2A is generated. In another embodiment, the data unit 220 of FIG. 2B is generated. In yet another embodiment, the data unit 300 of FIG. 3 is generated. In other embodiments, other suitable data units are generated. The preamble includes the signal field generated at block 702. The data portion is generated according to one of i) the information regarding the first mode or ii) the information regarding the second mode.

Figure 8:
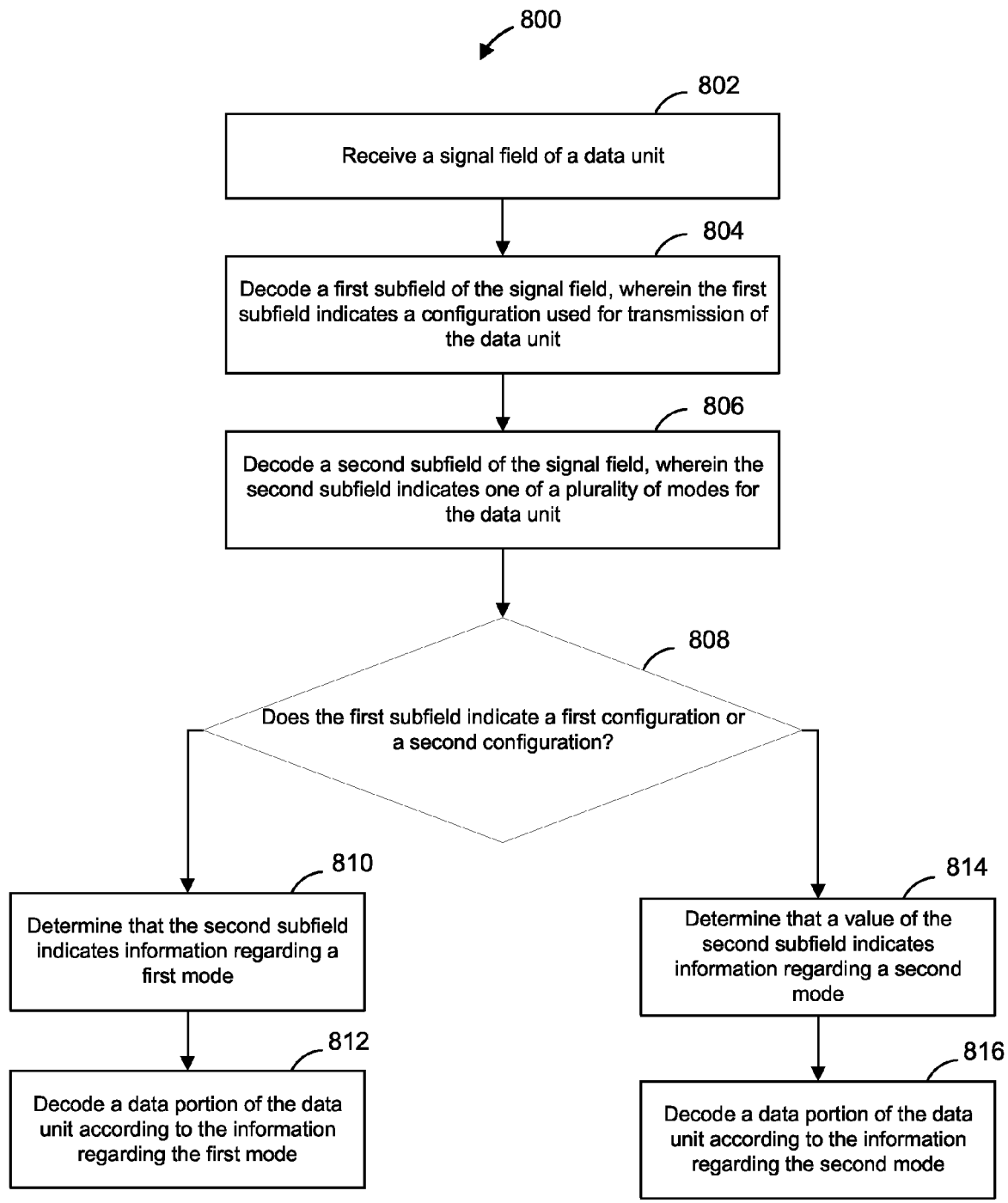
FIG. 8 is a flow diagram of an example method for receiving data units, according to an embodiment.

FIG. 8 is a flow diagram of an example method 800 for receiving data units, according to an embodiment. The method 800 is implemented by the network interface 16 (e.g., the PHY processing unit 20) (FIG. 1), in an embodiment. The method 800 is implemented by the network interface 27 (e.g., the PHY processing unit 29) (FIG. 1), in another embodiment. In other embodiments, the method 800 is implemented by other suitable network interfaces.

At block 802, a signal field of a data unit is received. For example, the signal field 350 of FIG. 4 is received, in an embodiment. In another embodiment, another suitable signal field is received. In an embodiment, the signal field includes some or all of the subfields 402 listed in the table 400 of FIG. 5. In another embodiment, the signal field includes some or all of the subfields 502 listed in the table 500 of FIG. 6. In other embodiments, the signal field includes other suitable subfields in addition to or instead of the subfields listed in the table 400 or in the table 500.

At block 804, a first subfield of the signal field is decoded. The first subfield indicates a configuration used for transmission of the data unit. In an embodiment, the first subfield corresponds to the subfield 352 of the signal field 350 of FIG. 4. In an embodiment, the first subfield indicates a number of spatial or space time streams used for transmission of the data unit. In another embodiment, the first subfield indicates another configuration (or mode) used for transmission of the data unit.

At block 806, a second subfield of the signal field is decoded. The second subfield indicates one of a plurality of modes for the data unit. In an embodiment, various modes in the plurality of modes are non-overlapping modes in that a first mode is utilized only for some values of the first subfield and a second mode is utilized only for other values of the first subfield. As just some examples, in various embodiments, the plurality of modes includes a Doppler mode, a STBC2 mode, and/or other non-overlapping modes.

At block 808, it is determined whether the first subfield indicates a first configuration or a second configuration. If it is determined that the first subfield indicates a first configuration, the method continues at block 810, at which it is determined that the second subfield indicates information regarding the first mode. Then, at block 812, a data portion of the data unit is decoded according to the information regarding the first mode. On the other hand, if it is determined at block 808 that the first subfield indicates a second configuration, the method continues at block 814, at which it is determined that the second subfield indicates information regarding the second mode. Then, at block 812, a data portion of the data unit is decoded according to the information regarding the second mode.

At least some of the various blocks, operations, and techniques described above may be implemented utilizing hardware, one or more processors executing firmware instructions, one or more processors executing software instructions, or any combination thereof. When implemented utilizing one or more processors executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the one or more processors, cause the one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method for generating an orthogonal frequency division multiplexing (OFDM) physical layer (PHY) data unit for transmission via a communication channel, the method comprising:
generating a signal field of the data unit to include
a first subfield to indicate a number of streams used for transmission of the data unit, and
a second subfield to indicate information regarding one of a plurality of modes for the data unit, including:

when the first subfield indicates a single stream is being used for transmission of the data unit, generating the second subfield to indicate whether a Doppler mode is being utilized for the data unit, wherein the second subfield does not provide information regarding a space time block code, and when the first subfield indicates multiple streams are being used for transmission of the data unit, generating the second subfield to indicate whether the space time block code is being utilized for the data unit, wherein the second subfield does not provide information regarding the Doppler mode; and generating the data unit to include a preamble and a data portion, wherein the signal field is included in the preamble, and wherein the data portion is generated according to mode information included in the second subfield.

2. The method of claim 1, wherein the second subfield includes one bit, and wherein:

when the first subfield indicates the single stream is being used for transmission of the data unit, the one bit indicates whether the Doppler mode is being utilized for the data unit, and when the first subfield indicates multiple streams are being used for transmission of the data unit, the one bit indicates whether the space time block code is being utilized for the data unit.

3. An apparatus, comprising:

a network interface configured to generate a signal field of the data unit to include:
  a first subfield to indicate a number of streams used for transmission of the data unit, and
  a second subfield to indicate information regarding one of a plurality of modes for the data unit, wherein the network interface is further configured to:
  when the first subfield indicates a single stream is being used for transmission of the data unit, generate the second subfield to indicate whether a Doppler mode is being utilized for the data unit, wherein the second subfield does not provide information regarding a space time block code, and
  when the first subfield indicates multiple streams are being used for transmission of the data unit, generate the second subfield to indicate whether the space time block code is being utilized for the data unit, wherein the second subfield does not provide information regarding the Doppler mode,
  generate the data unit to include a preamble and a data portion,
  include the signal field in the preamble, and
  generate the data portion according to mode information included in the second subfield.

4. The apparatus of claim 3, wherein the second subfield includes one bit, and wherein:

when the first subfield indicates the single stream is being used for transmission of the data unit, the one bit indicates whether the Doppler mode is being utilized for the data unit, and when the first subfield indicates multiple streams are being used for transmission of the data unit, the one bit indicates whether the space time block code is being utilized for the data unit.

5. A method for receiving an orthogonal frequency division multiplexing (OFDM) physical layer (PHY) data unit via a communication channel, the method comprising:

receiving a signal field of the data unit;

decoding a first subfield of the signal field, wherein the first subfield indicates a number of streams used for transmission of the data unit;

determining, based on a value of the first subfield, the number of streams used for transmission of the data unit;

decoding a second subfield of the signal field, including
  in response to determining that only a single stream was used for transmission of the data unit, determining that the second subfield indicates whether a Doppler mode is being utilized for the data unit, wherein the second subfield does not provide information regarding a space time block code, and
  in response to determining that multiple streams were used for transmission of the data unit, determining that the second subfield indicates whether the space time block code is being utilized for the data unit, wherein the second subfield does not provide information regarding the Doppler mode; and decoding a data portion of the data unit according to mode information included in the second subfield.

6. The method of claim 5, wherein the second subfield includes one bit, wherein:

when the first subfield indicates only a single stream is being used for transmission of the data unit, the one bit indicates whether the Doppler mode is being utilized for the data unit, and when the first subfield indicates multiple streams are being used for transmission of the data unit, the one bit indicates whether the space time block code is being utilized for the data unit.

7. An apparatus, comprising:

a network interface configured to receive a signal field of the data unit, decode a first subfield of the signal field, wherein the first subfield indicates a configuration used for transmission of the data unit, determine, based on a value of the first subfield, whether the configuration is a first configuration or a second configuration, decode a second subfield of the signal field, including
  in response to determining that only a single stream was used for transmission of the data unit, determining that the second subfield indicates whether a Doppler mode is being utilized for the data unit, wherein the second subfield does not provide information regarding a space time block code, and
  in response to determining that multiple streams were used for transmission of the data unit, determining that the second subfield indicates whether the space time block code is being utilized for the data unit, wherein the second subfield does not provide information regarding the Doppler mode; and wherein the network interface is further configured to decode a data portion of the data unit according to mode information included in the second subfield.

8. The apparatus of claim 7, wherein the second subfield includes one bit, wherein:

when the first subfield indicates only a single stream is being used for transmission of the data unit, the one bit indicates whether the Doppler mode is being utilized for the data unit, and when the first subfield indicates multiple streams are being used for transmission of the data unit, the one bit indicates whether the space time block code is being utilized for the data unit.

* * * * *